June 16, 1964
G. D. ROHWEDER ETAL
3,137,311
MANUALLY OPERATED MODULATION VALVE
Filed July 2, 1962
2 Sheets-Sheet 2
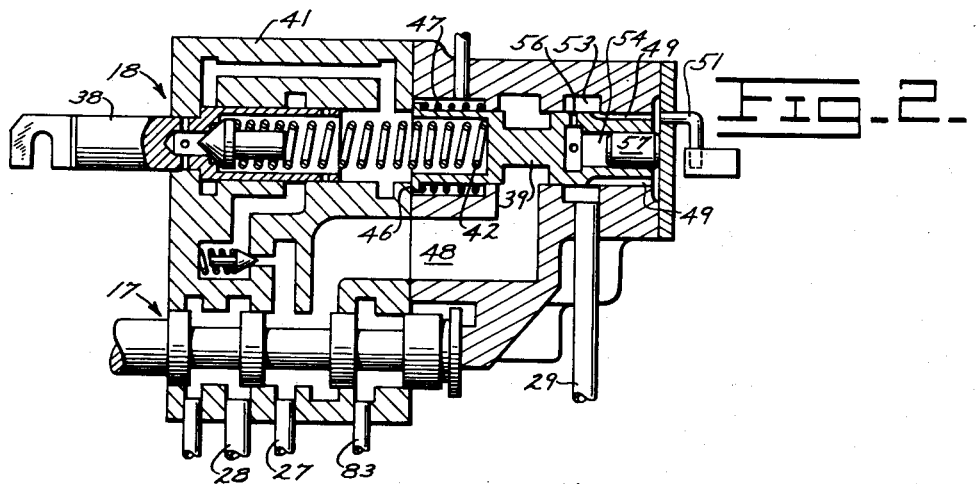
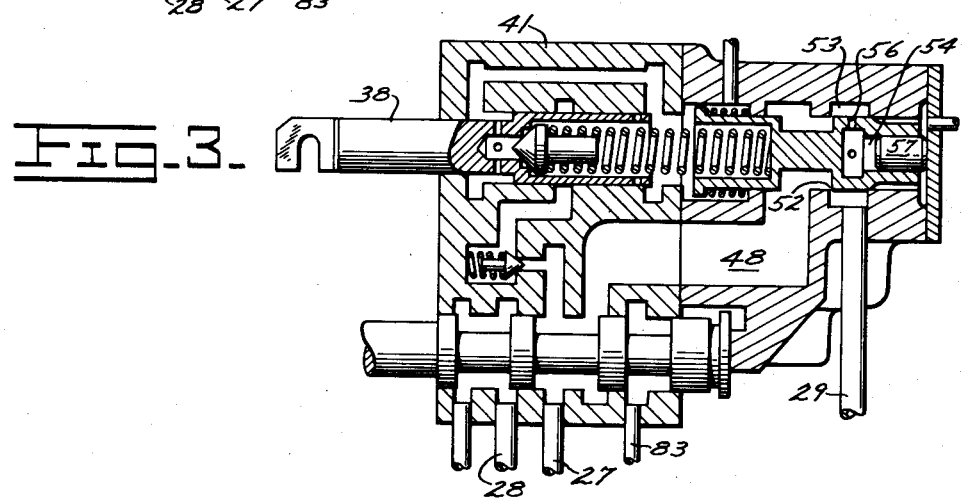
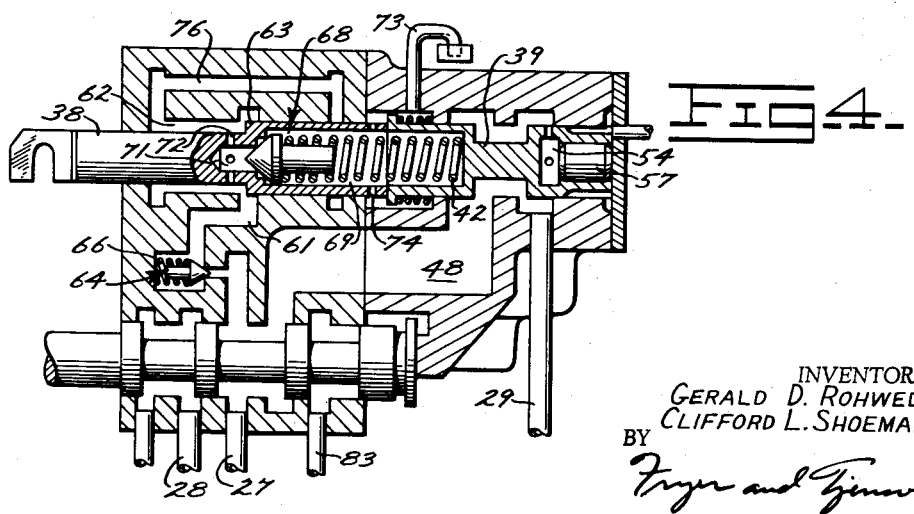
INVENTORS
GERALD D. ROHWEDER
CLIFFORD L. SHOEMAKER
BY
*Fryer and Tjensvold*
ATTORNEYS United States Patent Office 3,137,311
Patented June 16, 1964

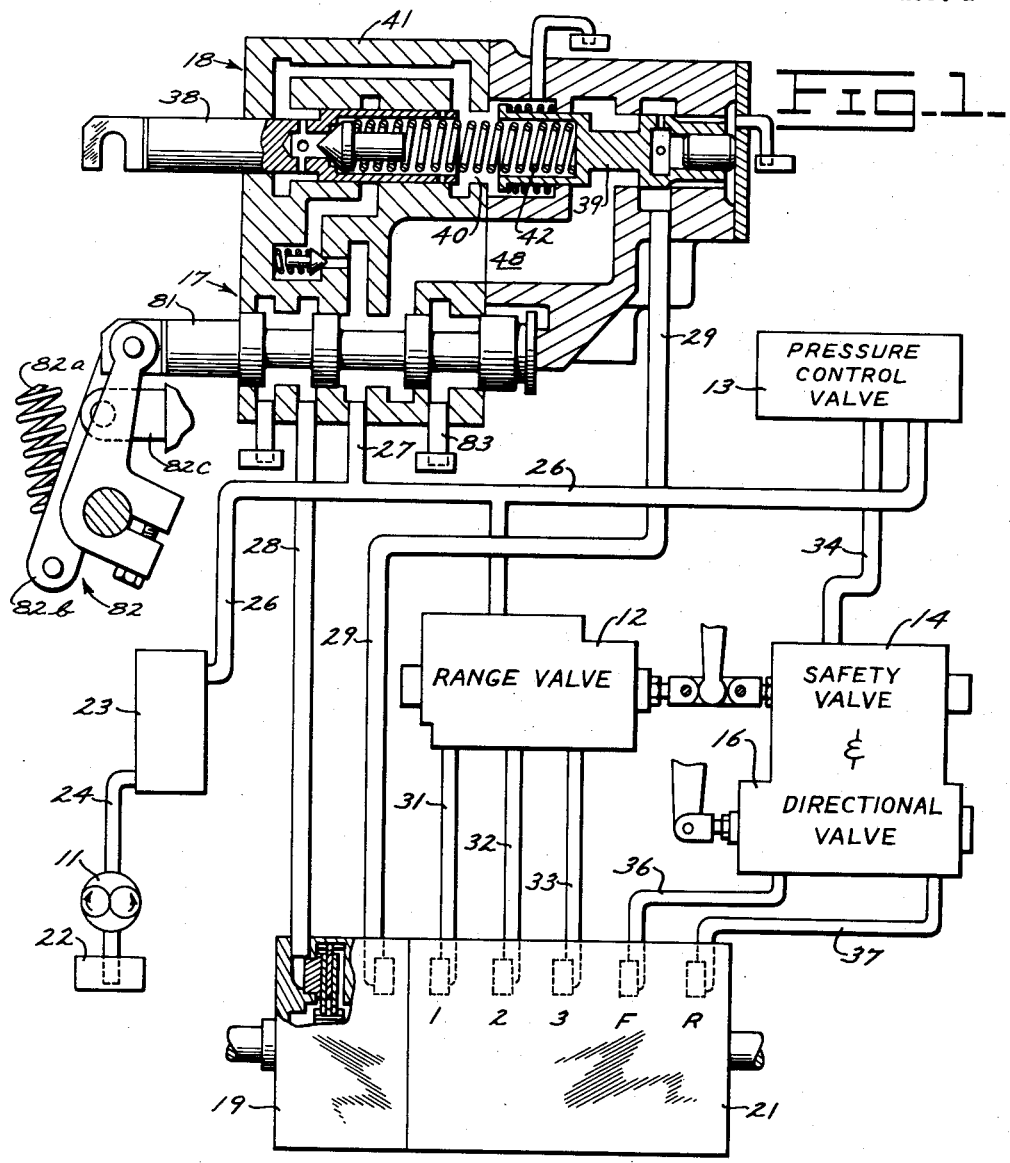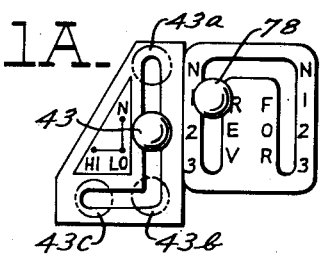

3,137,311
MANUALLY OPERATED MODULATION VALVE
Gerald D. Rohweder and Clifford L. Shoemaker, Peoria, Ill., assignors to Caterpillar Tractor Co., Peoria, Ill., a corporation of California
Filed July 2, 1962, Ser. No. 206,638
3 Claims. (Cl. 137—495)

The present invention relates to hydraulic valves and more particularly to a manually operated hydraulic valve for modulating the hydraulic pressure to a hydraulically operated mechanism.

It is often very desirable in the operation of heavy duty machinery, such as earth moving equipment, to be able to have relatively high engine speed but exceptionally low ground or traveling speed. Situations when such operation is desirable include maneuvering in limited space areas where a reduction in engine speed might cause the engine to be "killed," and when hydraulically operated components of the machinery are being used requiring the engine driven pump to be operated at a high speed. It is often desirable when utilizing such components to be able to maneuver the vehicle very slowly. The operation of a vehicle at very slow speed is commonly referred to as "inching"; a mode of vehicle operation which has in the past been accomplished in several ways.

One method for "inching" a vehicle is to use the vehicle brakes to retard the progress of the vehicle, but such brakes usually have lower capacity than the full torque output of the power train. This makes them inherently susceptible to high wear and requires considerable manual operator effort to achieve the desired result. Another method used to "inch" a vehicle is to operate it at lower throttle settings, but that is often most undesirable as high speed operation of the engine is often required at the same time that the machine is "inching."

The present invention provides means for "inching" a vehicle at high engine speed by use of a specially designed hydraulic valve which modulates the pressure to a transmission clutch such that clutch plate slippage can be accurately controlled. As will be seen by the description which follows, the manually operated valve through which the clutch-plate slippage is controlled has the very desirable feature of giving the operator controlling the valve a "feel" of the degree of clutch slippage which is taking place. Systems which are dependent on the brake system to accomplish "inching" do not give the operator an accurate "feel" of the amount of slippage which he is causing, and further require that continual physical effort by the operator be exerted. Thus, the present invention, by enabling the operator to have a "feel" of the degree of slippage taking place, greatly increases the accuracy with which he can control the system. A further advantage of the invention is that the manually operated valve can be set so that continual exertion of effort by the operator is not necessary to maintain a transmission clutch in either the engaged or disengaged state.

Accordingly, it is an object of the present invention to provide a manually operated valve which accurately controls the degree of pressure delivered to a hydraulically operated mechanism.

Another object of the present invention is to provide a hydraulic control valve for a transmission system wherein the valve is manually operated and controls the degree of clutch slippage within the vehicle transmission such that the vehicle can be operated at high engine speeds and low traveling speeds.

A further object of the present invention is to provide a manually operated hydraulic modulation valve which controls the degree of pressure to a transmission clutch wherein the operator of the valve has a "feel" of the degree of slippage which takes place in the transmission clutch.

It is yet another object of the present invention to provide a hydraulic modulation valve for controlling the degree of slip in a transmission clutch wherein the valve can be set in a desired position without requiring further effort by the operator of the valve to maintain the setting.

Further and more specific objects and advantages of the present invention are made apparent in the following specification wherein a preferred form of the invention is described by reference to the accompanying drawings.

In the drawings:

FIG. 1 is a schematic illustration of a dual transmission and hydraulic control system therefor, with the present invention shown forming part of the hydraulic control system;

FIG. 1a illustrates the transmission and modulation valve control levers;

FIG. 2, FIG. 3 and FIG. 4 are all enlarged cross-sectional drawings of the manually operated modulation valve of the invention with its components shown in their various operative positions.

While the present invention will be described with reference to its operation in conjunction with an overall transmission hydraulic control system it is to be understood that the invention resides in the means by which a source of hydraulic pressure is modulated by manual controls. Thus, while the invention has application with a transmission and particularly with the transmission system to be described, it will be appreciated by those in the art that the invention can be advantageously employed in a variety of ways and with devices and systems other than those particularly pointed out and described herein.

Referring now to FIG. 1, a hydraulic control system comprising a pump 11, a range valve 12, a pressure control valve 13, a safety valve 14, a directional valve 16, a selector valve 17, and the manually operated modulating valve 18 of the present invention, operate to control the pressure to various clutches in a vehicle transmission having a dual ratio load section 19, and a three-speed forward section 21 (sometimes referred to as the range transmission). The precise manner in which the hydraulic control system operates to provide pressures to various parts of the transmission and further provide modulation for such pressure is fully described in detail in assignee's copending application, Serial No. 809,535 for "Hydraulic Controls for Power Transmissions," filed April 28, 1959, now Patent No. 3,091,976. A general description of the manner in which the system operates, however, is helpful toward the understanding of the present invention and will therefore be described. When normal operation of the vehicle is desired (not "inching") pump 11 draws fluid from reservoir 22 and passes it through a filter 23 by way of conduit 24 to conduit 26. Clutch actuation fluid for load transmission 19 is supplied through selector valve 17, via conduit 27 to either the high ratio clutch connected to valve 17 by way of conduit 28 or the low ratio clutch connected to valve 17 via modulating valve 18 and conduit 29. The pressure in conduit 26 is controlled by pressure control valve 13 so that it is applied to the selected one of the clutches of load transmission 19 at a gradually increasing rate until a predetermined pressure is reached. A range valve 12 is supplied with fluid from conduit 26 and selects one of the forward transmission speed ratios by directing hydraulic fluid through one of conduits 31, 32 or 33. The pressure to the forward transmission 21 is thus likewise controlled by pressure control valve 13 and modulated in the same manner as the pressure delivered to the load transmission 19. Pressure control valve 13 is connected to safety valve 14 and directional valve 16 through conduit 34 and has mechanism which insures that the pressure in line 26 exceeds that in line 34 so that engagement of the load transmission clutch and forward transmission clutches precedes the engagement of the selected direction clutch which receives actuating fluid via conduits 36 or 37. In this manner one of the directional clutches, rather than a speed clutch, will pick up the load.

When valve 17 is positioned to deliver hydraulic fluid to the low ratio clutch of load transmission 19 (as shown in FIG. 1) modulation valve 18 is positioned so as to provide an unobstructed path from valve 17 to conduit 29 when normal operation is desired. If, however, it is desired to "inch" the vehicle, modulation valve 18 is conditioned such that the pressure in conduit 29 is greatly reduced enabling the low ratio clutch to slip, thereby reducing the driving torque provided to the vehicle wheels.

Manual modulation valve 18 comprises a load piston 38 axially aligned with a pressure modulating reducing valve 39 in a suitable bore 40 in valve body 41. Load piston 38 and valve 39 are positionally dependent by virtue of a valve spring 42 connected to each of the valve components. The valve piston 38 is connected through suitable linkage (not shown) to modulation selector knob 43 shown in FIG. 1a. The movement of the control lever 43 from the top of FIG. 1a downward results in corresponding movement of the load piston 38 to the right (as shown in FIG. 1) through the linkage connecting the two devices, and in the same manner movement of lever 43 upward results in movement of piston 38 to the left. When selector 43 is moved to its extreme upward position, as shown in phantom at 43a, load piston 38 is moved to its extreme leftward position causing valve spool 39 to move leftward until it hits stop 46, as shown in FIG. 2. When piston 38 is in its leftwardly most position spring 42 exerts a force on spool 39 urging the spool to the right, but a spring 47, which circumscribes one end of the spool 39, exerts a force leftwardly on the spool sufficient to overcome the force of spring 42 and urge the spool against stop 46.

When spool 39 is in this position, passageway 48 is blocked from conduit 29, thus preventing any fluid pressure from building up in the transmission clutch, thereby effectively neutralizing the transmission. A pair of metering slots 49 are provided in the end of spool 39 so that when selector 43 is in the neutral position, any fluid pressure which may have previously existed in the passageway 29 and the transmission clutch is relieved through slots 49 which communicate with a drain line 51.

As selector 43 is moved downward to the position shown in solid lines in FIG. 1a, load piston 38 is moved to the right causing spring 42 to compress and thus exert additional rightward force on spool 39. The additional force on spool 39 from spring 42 is sufficient to overcome the force of spring 47 and move valve 39 to the right until an annular opening 52 between valve spool 39 and valve body 41 is established (FIG. 3). Passageway 48 thus communicates with conduit 29 allowing pressure to build up in the transmission clutch, resulting in engagement thereof. The movement of spool 39 to the right causes the communication between metering slots 49 and recess 53 to be discontinued, thus enabling pressure to be built up in conduit 29 and the clutch with which it communicates. As the pressure builds up in conduit 29, fluid will enter a chamber 54 in spool 39 through orifice 56. This pressure acts against the area of slug 57 and urges valve spool 39 to the left. When the pressure in chamber 54—which is the same pressure as exists in conduit 29—is sufficient to close orifice 52 against the force of spring 42 a balance state will occur. If pressure drops in conduit 29 due to leakage or the like, the pressure will also drop in chamber 54 and orifice 52 will again open enabling the pressure to build up until the desired pressure is again reached.

Thus, depending upon the amount of pressure exerted by spring 42 on spool 39 the pressure in conduit 29 will be built up to, and maintained at a particular constant value. As the pressure in conduit 29 increases so also will the engagement force which is applied to the transmission clutch. Thus by choosing the right amount of engaging pressure, slip in the transmission clutch can be controlled to produce the desired traveling speed. The operator has the "feel" of the amount of slip being induced by virtue of the reaction force exerted against selector 43 by spring 42.

When selector 43 is moved all the way downward to position 43b, load piston 38 is moved to its extreme rightward position compressing spring 42 and thus urging spool 39 to its extreme rightward position (FIG. 4). When load piston 38 moves to its extreme rightward position, a passageway 61, which is normally blocked by piston 38, is open to communication with a chamber 62, by virtue of step 63 of the load piston moving beyond the opening of passageway 61. Since the pressure in chamber 48 will be greater than that in chamber 62, a check valve 64 between chamber 48 and chamber 62 will open against the action of its low rate retaining spring 66 and allow fluid to enter chamber 62 and build up pressure therein. The force of the fluid pressure in chamber 62 acting against load piston 38 will be greater than the force of the fluid pressure in chamber 54 acting against slug 57 and thus the valve component will be locked in the extreme rightward position as shown in FIG. 4. The spool will thus remain in this position even if the operator removes his hand from selector 43. Prior to reaching this extreme downward position, however, the release of selector 43 by the operator enables compressed spring 42 to urge the piston 38 to the left and thus return the selector 43 to its 43a position and place the transmission in neutral.

Once fluid has entered chamber 62 and passageway 61 it is virtually trapped there and an effort by the operator to move load piston 38 to the left is resisted. To provide an escape for the fluid, a check valve 68 is provided in load piston 38 so that upon the application of sufficient pressure the valve will open and enable fluid to enter spring chamber 69. The spring which maintains check valve 68 closed is of sufficient force to maintain the valve closed under conditions where the valve is locked in the position shown in FIG. 4. When the operator exerts additional force on load piston 38, through selector valve 43, in moving the piston to the left the pressure of the fluid in chamber 62 will be increased due to being compressed. Check valve 68 is disposed between spring chamber 69 and a chamber 71 which communicates with chamber 62 via ports 72. Thus, pressure changes in chamber 62 will be reflected in chamber 71. When the fluid in pressure chamber 62 is increased, the pressure in chamber 71 will increase sufficiently to open the check valve 68 thereby allowing the fluid in chamber 62 to escape through drain 73 which communicates with chamber 69. Since it would be inconvenient for the operator to have to exert a force on selector 43 for the entire distance from its lowest position to its highest position, ports 74 in piston 38 are provided so that when piston 38 is moved leftwardly a small distance, a passage 76 communicates chamber 62 with spring chamber 69 and drain 73. Thus, in operation, when the selector is hydraulically locked at position 43b and it is desired to move it to position 43a the operator is only required to exert a force for a short time, after which the selector automatically moves to the neutral (43a) position.

Check valve 64 serves a function other than to allow fluid to enter for the purpose of locking the components in the fully opened position. It also prevents the loss of pressure in chamber 62 when a pressure drop is experienced in the supply line 27 due to a gear shift of the transmission which initiates a new modulation cycle. If check valve 64 were not provided, the loss of pressure in chamber 62 would unlock the modulation valve components and require that the selector 43 be repositioned to its fully open (43b) position each time that gear selector 78 was moved.

The valve of the present invention also enables the load to be picked up either in the conventional manner—by one of the directional clutches—or by the clutch supplied with actuating fluid from conduit 27. If all clutches in the forward transmission have reached their peak engaging pressure and selector 43 is slowly moved from the neutral position downward, the pressure in conduit 29 will slowly rise, thus causing the load to be picked up by the clutch which is supplied with fluid from conduit 29. If, on the other hand, the selector 43 is moved quickly from the neutral position downward, the hydraulic fluid filling the clutch communicating with line 29 will cause a drop in pressure in line 26 sufficient to initiate a new modulation cycle of the rest of the hydraulic control system and thus the directional clutches will pick up the load in the normal manner described above.

The above description of the modulating control valve 18 has been made with reference to selector valve 17 in the position shown in FIGS. 1 through 4. Spool 81 of selector valve 17 is connected by means of linkage 82 through selector 43 such that supply line 27 communicates with passage 48 as long as selector 43 is between positions 43a and 43b. If selector 43, however, is moved leftwardly to position 43c, selector valve spool 81 moves to the left so that drain line 83 communicates with chamber 48 allowing the fluid in passage 29 to escape. At the same time, communication is discontinued between supply line 27 and chamber 48 and established with conduit 28 leading to a clutch for engaging the transmission 19 in a higher gear ratio. The shift from position 43b to 43c for the purpose of shifting transmission 19 from low to high is accompanied by a drop in pressure in line 26 because of the filling of the clutch connected to conduit 28. This will cause a new modulation cycle of pressure by control valve 13 and insure that the load is not picked up by the load transmission clutch but rather by one of the directional clutches. Valve selector spool 81 has associated therewith an overcenter linkage arrangement including a spring 82a, a link 82b, a fixed pivot 82c, and appropriate pivot pins, so that once the lever is on one side or the other of the exact center it will be urged to an extreme position. Such overcentering mechanisms are well understood in the art and are generally provided for the purpose of insuring that an adjustable mechanism be in one of the two possible positions, rather than anywhere therebetween.

We claim:

1. In a manually adjustable valve for modulating hydraulic pressure wherein the valve is hydraulically disposed between a source of hydraulic fluid and a hydraulically actuated mechanism, the combination comprising;

a valve spool slidably disposed in a valve bore, the bore having an outlet orifice leading to the mechanism and an inlet orifice leading to the source of fluid, said valve spool having an extreme position in one direction in which said spool does not obstruct fluid flow from the inlet to outlet, and an extreme position in the other direction in which said spool prevents fluid flow between the inlet and outlet;

a valve spring disposed to act on said valve spool and provide a force urging said valve spool in the direction in which fluid flow between the inlet and outlet is not obstructed;

manually adjustable means associated with said spring and operative to vary the force which said spring applies to said spool, said adjustable means having the reaction force of said spring applied thereagainst whereby said adjustable means is positioned to condition said spring to apply the minimum force to said spool in the absence of manual operation of said adjustable means;

means applying the pressure at the outlet orifice to said spool to provide a force which acts against said spring and urges said spool to a position in which fluid flow between the inlet and outlet is blocked whereby the pressure in the outlet is maintained at a pressure dependent upon the position of said adjustable means and the spring force created thereby; and means locking said adjustable means in position against the reaction force of said spring only when said adjustable means is urged to the extreme position which corresponds to a maximum force being applied to said spool by said spring, said adjustable means operating independently of said locking means in all other positions.

2. In a manually adjustable valve for modulating hydraulic pressure wherein the valve is hydraulically disposed between a source of hydraulic fluid and a hydraulically actuated mechanism the combination comprising;

a valve spool slidably disposed in a valve bore, the bore having an outlet orifice leading to the mechanism and an inlet orifice leading to the source of fluid, said valve spool having an extreme position in one direction in which said spool does not obstruct fluid flow from the inlet to outlet, and an extreme position in the other direction in which said spool prevents fluid flow between the inlet and outlet;

a valve spring disposed to act on said valve spool and provide a force urging said valve spool in the direction in which fluid flow between the inlet and outlet is not obstructed;

manually adjustable means associated with said spring and operative to vary the force which said spring applies to said spool, said adjustable means having the reaction force of said spring applied thereagainst whereby said adjustable means is positioned to condition said spring to apply the minimum force to said spool in the absence of manual operation of said adjustable means;

means applying the pressure at the outlet orifice to said spool to provide a force which acts against said spring and urges said spool to a position in which fluid flow between the inlet and outlet is blocked whereby the pressure in the outlet is maintained at a pressure dependent upon the position of said adjustable means and the spring force created thereby;

a piston associated with said adjustable means and slidably disposed in a bore which is in axial alignment with said spring;

conduit means between the inlet and the bore of said piston; and means registering said conduit means with one end of said piston only when said adjustable means is positioned to apply the maximum spring force to said spool whereby the inlet pressure acts to urge said piston in opposition to said spring.

3. The adjustable valve of claim 2 further comprising a check valve hydraulically disposed in said conduit between said piston and the inlet whereby a drop in inlet pressure will not release the adjustable means from the maximum force setting when being retained in that position by inlet fluid pressure acting on said piston.

References Cited in the file of this patent

UNITED STATES PATENTS

| 646,064 | Baylis | Mar. 27, 1900 |
| 3,023,773 | Hasbany | Mar. 6, 1962 |
| 3,048,055 | Borman et al. | Aug. 7, 1962 |
| 3,098,507 | Froslie | July 23, 1963 |